United States Patent
Zorn et al.

(10) Patent No.: US 12,530,176 B2
(45) Date of Patent: Jan. 20, 2026

(54) GENERATION OF MULTI-DIMENSIONAL ARRAY OF INTERMEDIATE VALUES IN MULTIPLE CODE EXECUTIONS

(71) Applicant: Microsoft Technology Licensing, LLC, Redmond, WA (US)

(72) Inventors: Benjamin Goth Zorn, Woodinville, WA (US); Kasra Ferdowsifard, San Diego, CA (US); John Herbert Martin Williams, Sheffield (GB); Carina Suzana Negreanu, Cambridge (GB); Andrew Donald Gordon, Cambridge (GB); Advait Sarkar, Cambridge (GB); Ian Zachariah Drosos, Cambridge (GB); Neil Blunt Toronto, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 18/154,741

(22) Filed: Jan. 13, 2023

(65) Prior Publication Data

US 2024/0241703 A1    Jul. 18, 2024

(51) Int. Cl.
   *G06F 8/41* (2018.01)
   *G06F 8/34* (2018.01)
(52) U.S. Cl.
   CPC . *G06F 8/43* (2013.01); *G06F 8/34* (2013.01)
(58) Field of Classification Search
   CPC .................................. G06F 8/43; G06F 8/34
   See application file for complete search history.

(56) References Cited

U.S. PATENT DOCUMENTS

| 9,064,052 B1 | 6/2015 | Bienkowski |
| 2001/0049695 A1 | 12/2001 | Chi et al. |

(Continued)

FOREIGN PATENT DOCUMENTS

| CN | 110580478 A | * | 12/2019 | ......... G06K 9/00463 |
| CN | 113282681 A | * | 8/2021 | ............. G06F 16/22 |

(Continued)

OTHER PUBLICATIONS

International Search Report and Written Opinion received for PCT Application No. PCT/US2023/083709, Apr. 24, 2024, 15 pages.

(Continued)

*Primary Examiner* — Phillip H Nguyen
(74) *Attorney, Agent, or Firm* — Workman Nydegger

(57) ABSTRACT

A mechanism to show how code is operating with different sets of input. After accessing the code that is to be evaluated along with the multiple input sets for that code, the computing system generates a multi-dimensional array of values. This is done by, for each of at least some of the multiple input sets, generating a corresponding intermediate value set of one or more intermediate values that are generated as the code operates upon the corresponding input set to generate a corresponding output value set. Then, the computing system causes a multi-dimensional array of values to be visualized using a multi-dimensional representation. In this multi-dimensional visualization, input sets are represented in at least one dimension against at least one intermediate value of the corresponding intermediate value set in at least another dimension.

20 Claims, 8 Drawing Sheets

(56) References Cited

U.S. PATENT DOCUMENTS

| | | | | |
|---|---|---|---|---|
| 2003/0144868 | A1* | 7/2003 | MacIntyre | G06Q 10/063 |
| | | | | 707/999.107 |
| 2012/0147008 | A1* | 6/2012 | Lin | G06T 15/20 |
| | | | | 345/427 |
| 2014/0280978 | A1* | 9/2014 | Martinez | H04L 47/70 |
| | | | | 709/226 |
| 2014/0351529 | A1* | 11/2014 | Wells | G06F 3/0673 |
| | | | | 711/157 |
| 2019/0095508 | A1 | 3/2019 | Porath | |
| 2022/0335947 | A1* | 10/2022 | Li | G10L 15/26 |

FOREIGN PATENT DOCUMENTS

| | | | | |
|---|---|---|---|---|
| EP | 1643387 | B1 | 4/2019 | |
| TW | 201445342 | A * | 12/2014 | G06F 16/2428 |
| WO | 2021217119 | A1 | 10/2021 | |

OTHER PUBLICATIONS

"Pandas—Version: 1.5.2", Retrieved From https://pandas.pydata.org/, Nov. 22, 2022, 4 Pages.

"Pyodide—Version: 0.21.3", Retrieved From https://pyodide.org/en/stable/, Sep. 24, 2022, 2 Pages.

"Questions tagged [excel-formula]", Retrieved From: https://web.archive.org/web/20220923095440/https://stackoverflow.com/questions/tagged/excel-formula#, Sep. 23, 2022, 8 Pages.

Abraham, et al., "Goal-Directed Debugging of Spreadsheets", In Proceedings of Symposium on Visual Languages and Human-Centric Computing, Sep. 20, 2005, 8 Pages.

Abraham, et al., "Visual Specifications of Correct Spreadsheets", In Proceedings of Symposium on Visual Languages and Human-Centric Computing, Sep. 20, 2005, 8 Pages.

Albarghouthi, et al., "Recursive Program Synthesis", In Proceedings of 25th International Conference on Computer Aided Verification, Jul. 13, 2013, pp. 934-950.

Barke, et al., "Grounded Copilot: How Programmers Interact with Code-Generating Models", In Repository of arXiv:2206.15000v1, Jun. 30, 2022, 24 Pages.

Barke, et al., "Just-in-Time Learning for Bottom-Up Enumerative Synthesis", In Proceedings of the ACM on Programming Languages, vol. 4, Issue OOPSLA, Article 227, Nov. 13, 2020, 29 Pages.

Boulay, Benedictd. , "Some Difficulties of Learning to Program", In Journal of Educational Computing Research vol. 2, Issue 1, Feb. 1986, pp. 57-73.

Chalhoub, et al., "It's Freedom to Put Things Where My Mind Wants": Understanding and Improving the User Experience of Structuring Data in Spreadsheets, In Proceedings of CHI Conference on Human Factors in Computing Systems, Apr. 29, 2022, 24 Pages.

Chasins, et al., "Rousillon: Scraping Distributed Hierarchical Web Data", In Proceedings of the 31st Annual ACM Symposium on User Interface Software and Technology, Oct. 14, 2018, pp. 963-975.

Chen, et al., "Evaluating Large Language Models Trained on Code", in Repository of arXiv:2107.03374v1, Jul. 7, 2021, 35 Pages.

Chowdhery, et al., "PaLM: Scaling Language Modeling with Pathways", In Repository of arXiv:2204.02311v1, Apr. 5, 2022, 83 Pages.

Dell, et al., ""Yours is Better!" Participant Response Bias in HCI", In Proceedings of the SIGCHI Conference on Human Factors in Computing Systems, May 5, 2012, pp. 1321-1330.

Dhamdhere, et al., "Analyza: Exploring Data with Conversation", In Proceedings of the 22nd International Conference on Intelligent User Interfaces, Mar. 13, 2017, pp. 493-504.

Dinella, et al., "TOGA: A Neural Method for Test Oracle Generation", In Proceedings of the 44th International Conference on Software Engineering, May 21, 2022, pp. 2130-2141.

Dourish, Paul, "Chapter 4—Spreadsheets and Spreadsheet Events in Organizational Life", Published in book The Stuff of Bits: An Essay on the Materialities of Information, 2017, pp. 81-104.

Drosos, et al., "Wrex: A Unified Programming-by-Example Interaction for Synthesizing Readable Code for Data Scientists", In Proceedings of the CHI Conference on Human Factors in Computing Systems, Apr. 25, 2020, 12 Pages.

Eiband, et al., "How to Support Users in Understanding Intelligent Systems? Structuring the Discussion", In Proceedings of 26th International Conference on Intelligent User Interfaces, Apr. 14, 2021, pp. 120-132.

Ferdowsifard, et al., "Small-Step Live Programming by Example", In Proceedings of the 33rd Annual ACM Symposium on User Interface Software and Technology, Oct. 20, 2020, pp. 614-626.

Flanagan, et al., "The Essence of Compiling with Continuations", In Proceedings of the ACM SIGPLAN Conference on Programming Language Design and Implementation, Jun. 23, 1993, pp. 237-247.

Friedman, Nat, "Introducing GitHub Copilot: your AI pair programmer", Retrieved From: https://github.blog/2021-06-29-introducing-github-copilot-ai-pair-programmer/, Jun. 29, 2021, 7 Pages.

Fritz, et al., "A Formal Framework for Combining Natural Instruction and Demonstration for End-User Programming", In Proceedings of the 16th International Conference on Intelligent User Interfaces, Feb. 13, 2011, pp. 237-246.

Galenson, et al., "CodeHint: Dynamic and Interactive Synthesis of Code Snippets", In Proceedings of the 36th International Conference on Software Engineering, May 31, 2014, pp. 653-663.

Gines, Mar, "Better Insights from Analyze Data feature in Excel", Retrieved From https://insider.office.com/en-us/blog/better-insights-from-analyze-data-feature-in-excel, Feb. 2, 2022, 5 Pages.

Gulwani, Sumit, "Automating String Processing in Spreadsheets Using Input-Output Examples", In Journal of ACM Sigplan Notices, vol. 46, Issue 1, Jan. 26, 2011, pp. 317-329.

Gulwani, et al., "Synthesis of Loop-free Programs", In Proceedings of the 32nd ACM SIGPLAN Conference on Programming Language Design and Implementation, Jun. 4, 2011, pp. 62-73.

Hall, et al., "Structuring Spreadsheets with the "Lish" Data Model", In Repository of arXiv:1801.08603v1, Jan. 25, 2018, 13 Pages.

Hempel, et al., "Maniposynth: Bimodal Tangible Functional Programming", In Proceedings of 36th European Conference on Object-Oriented Programming, Jun. 23, 2022, 29 Pages.

Hermans, et al., "Spreadsheets are Code: An Overview of Software Engineering Approaches Applied to Spreadsheets", In Proceedings of IEEE 23rd International Conference on Software Analysis, Evolution, and Reengineering, vol. 5, Mar. 14, 2016, pp. 56-65.

Jain, et al., "Jigsaw: Large Language Models meet Program Synthesis", In Proceedings of the 44th International Conference on Software Engineering, May 21, 2022, pp. 1219-1231.

James, et al., "Digging for Fold: Synthesis-Aided API Discovery for Haskell", In Proceedings of the ACM on Programming Languages, vol. 4, Issue OOPSLA, Article 205, Nov. 13, 2020, 27 Pages.

James, et al., "Program Recognition in Synthesis", In Proceedings of Plateau 12th Annual Workshop at the Intersection of PL and HCI, Nov. 9, 2021, 5 Pages.

Jannach, et al., "Fragment-based Spreadsheet Debugging", In Journal of Automated Software Engineering, vol. 26, Issue 1, Dec. 22, 2018, pp. 203-239.

Jayagopal, et al., "Exploring the Learnability of Program Synthesizers by Novice Programmers", In Proceedings of the 35th Annual ACM Symposium on User Interface Software and Technology, Oct. 29, 2022, 15 Pages.

Kay, Alan, "Computer Software", In Journal of Scientific American, vol. 251, Issue 3, Sep. 1984, 8 Pages.

Ko, et al., "Designing the Whyline: A Debugging Interface for Asking Questions about Program Behavior", In Proceedings of the SIGCHI Conference on Human Factors in Computing Systems, Apr. 24, 2004, pp. 151-158.

Ko, et al., "The State of the Art in End-User Software Engineering", In Journal of ACM Computing Surveys, vol. 43, Issue 3, Article 21, Apr. 29, 2011, 44 Pages.

(56) References Cited

OTHER PUBLICATIONS

Kulesza, et al., "Fixing the Program my Computer Learned: Barriers for End Users, Challenges for the Machine", In Proceedings of the 14th International Conference on Intelligent User Interfaces, Feb. 8, 2009, pp. 187-196.
Lee, et al., "Accelerating Search-Based Program Synthesis using Learned Probabilistic Models", In Proceedings of the 39th ACM SIGPLAN Conference on Programming Language Design and Implementation, Jun. 18, 2018, pp. 436-449.
Lee, et al., "Towards Understanding Human Mistakes of Programming by Example: An Online User Study", In Proceedings of the 22nd International Conference on Intelligent User Interfaces, Mar. 13, 2017, pp. 257-261.
Li, et al., "Competition-Level Code Generation with Alphacode", In Repository of arXiv:2203.07814v1, Feb. 8, 2022, 74 Pages.
Lieberman, et al., "End-User Debugging for E-Commerce", In Proceedings of the 8th International Conference on Intelligent User Interfaces, Jan. 12, 2003, pp. 257-259.
Lubin, et al., "Program Sketching with Live Bidirectional Evaluation", In Proceedings of the ACM on Programming Languages, vol. 4, Issue ICFP, Article 109, Aug. 3, 2020, 29 Pages.
Mayer, et al., "User Interaction Models for Disambiguation in Programming by Example", In Proceedings of the 28th Annual ACM Symposium on User Interface Software & Technology, Nov. 8, 2015, pp. 291-301.
McCutchen, et al., "Object Spreadsheets: A New Computational Model for End-User Development of Data-Centric Web Applications", In Proceedings of the ACM International Symposium on New Ideas, New Paradigms, and Reflections on Programming and Software, Nov. 2, 2016, pp. 112-127.
Miller, et al., "Gradual Structuring in the Spreadsheet Paradigm", In Proceedings of IEEE Symposium on Visual Languages and Human-Centric Computing (VL/HCC), Sep. 4, 2016, pp. 240-241.
Nardi, et al., "The Spreadsheet Interface: A Basis for End User Programming", In Proceedings of Third International Conference on Human-Computer Interaction, Aug. 27, 1990, 11 Pages.
Osera, et al., "Type-and-Example-Directed Program Synthesis", In Proceedings of the 36th ACM SIGPLAN Conference on Programming Language Design and Implementation, Jun. 13, 2015, pp. 619-630.
Pal, Anjali, "Top 50 Bestselling Novels 2009-2020 of Amazon", Retrieved From: https://www.kaggle.com/datasets/palanjali007/amazons-top-50-bestselling-novels-20092020, 2020, 23 Pages.
"Pandas-dev/pandas: Pandas", Retrieved From: https://zenodo.org/record/7344967#.Y5eB7HZBw2y, Nov. 22, 2022, 5 Pages.
"Application as Filed in U.S. Appl. No. 17/976,570", filed Oct. 28, 2022, 45 Pages.
Lerner, Sorin, "Projection Boxes: On-the-fly Reconfigurable Visualization for Live Programming", In Proceedings of the CHI Conference on Human Factors in Computing Systems, Apr. 25, 2020, 7 Pages.
Zhang, et al., "OPT: Open Pre-trained Transformer Language Models", In Repository of arXiv:2205.01068v1, May 2, 2022, 30 Pages.
Lezama, Armandos., "Program Sketching", In International Journal on Software Tools for Technology Transfer, vol. 15, Issue 5, Aug. 2, 2012, pp. 475-495.
Peleg, et al., "Programming with a Read-Eval-Synth Loop", In Proceedings of the ACM on Programming Languages, vol. 4, Issue OOPSLA, Article 159, Nov. 13, 2020, 30 Pages.
Polikarpova, et al., "Program Synthesis from Polymorphic Refinement Types", In Proceedings of the 37th ACM SIGPLAN Conference on Programming Language Design and Implementation, Jun. 13, 2016, pp. 522-538.
Polikarpova, et al., "Structuring the Synthesis of Heap-Manipulating Programs", In Proceedings of the ACM on Programming Languages, vol. 3, Issue POPL, Article 72, Jan. 2, 2019, 30 Pages.
Ragavan, et al., "GridBook: Natural Language Formulas for the Spreadsheet Grid", In Proceedings of 27th International Conference on Intelligent User Interfaces, Mar. 22, 2022, pp. 345-368.
Ramachandran, Aditya, "Top IMDB Rated TV Shows", Retrieved From: https://www.kaggle.com/datasets/adityaramachandran27/top-imdb-rated-tv-shows, Jul. 2022, 19 Pages.
Sarkar, et al., "Calculation View: Multiple-Representation Editing in Spreadsheets", In Proceedings of IEEE Symposium on Visual Languages and Human-Centric Computing (VL/HCC), Oct. 1, 2018, pp. 85-93.
Sarkar, et al., "End-User Encounters with Lambda Abstraction in Spreadsheets: Apollo's Bow or Achilles' Heel?", In Proceedings of IEEE Symposium on Visual Languages and Human-Centric Computing (VL/HCC), Sep. 12, 2022, 11 Pages.
Sarkar, et al., "Interactive Visual Machine Learning in Spreadsheets", In Proceedings of IEEE Symposium on Visual Languages and Human-Centric Computing (VL/HCC), Oct. 18, 2015, 5 Pages.
Sarkar, et al., "What is it Like to Program with Artificial Intelligence?", In Repository of arXiv:2208.06213v1, Aug. 12, 2022, 26 Pages.
Schlegel, et al., "Vajra: Step-by-step Programming with Natural Language", In Proceedings of the 24th International Conference on Intelligent User Interfaces, Mar. 17, 2019, pp. 30-39.
Schmitz, et al., "A Decomposition-Based Approach to Spreadsheet Testing and Debugging", In Proceedings of Symposium on Visual Languages and Human-Centric Computing (VL/HCC), Oct. 11, 2017, pp. 117-121.
Schmitz, et al., "Fragment-Based Diagnosis of Spreadsheets", In Proceedings of Software Technologies: Applications and Foundations, Jul. 4, 2016, pp. 372-387.
Schwarzkopf, et al., "Towards Intuitive Interaction for End-User Programming", In Proceedings of the 8th International Conference on Intelligent User Interfaces, Jan. 12, 2003, pp. 287-289.
Shi, et al., "FrAngel: Component-Based Synthesis with Control Structures", In Proceedings of the ACM on Programming Languages, vol. 3, Issue POPL, Article 73, Jan. 2, 2019, 29 Pages.
Shneiderman, Ben, "1.1 Direct Manipulation: A Step Beyond Programming Languages", In Book of Sparks of Innovation in Human-Computer Interaction, 1993, 19 Pages.
Shrestha, et al., "Unravel: A Fluent Code Explorer for Data Wrangling", In Proceedings of 34th Annual ACM Symposium on User Interface Software and Technology, Oct. 10, 2021, pp. 198-207.
Szymanski, et al., "Visual, Textual or Hybrid: the Effect of User Expertise on Different Explanations", In Proceedings of 26th International Conference on Intelligent User Interfaces, Apr. 14, 2021, pp. 109-119.
Tohidi, et al., "Getting the Right Design and the Design Right: Testing Many Is Better Than One", In Proceedings of the SIGCHI Conference on Human Factors in Computing Systems, Apr. 22, 2006, pp. 1243-1252.
Vaithilingam, et al., "Expectation vs. Experience: Evaluating the Usability of Code Generation Tools Powered by Large Language Models", In Proceedings of Extended Abstracts of the CHI Conference on Human Factors in Computing Systems, Apr. 29, 2022, 7 Pages.
Weiser, Mark, "Program Slicing", In Journal of IEEE Transactions on Software Engineering, vol. SE-10, Issue 4, Jul. 1984, pp. 352-357.
Whitington, et al., "Direct Interpretation of Functional Programs for Debugging", In Proceedings of ML Family/OCaml Users and Developers Workshops, Sep. 7, 2017, pp. 41-73.
Wilson, et al., "Harnessing Curiosity to Increase Correctness in End-User Programming", In Proceedings of the SIGCHI Conference on Human Factors in Computing Systems, Apr. 5, 2003, pp. 305-312.
Yang, et al., "How Do Visual Explanations Foster End Users' Appropriate Trust in Machine Learning?", In Proceedings of the 25th International Conference on Intelligent User Interfaces, Mar. 17, 2020, pp. 189-201.
Zhang, et al., "Automated Refactoring of Nested-IF Formulae in Spreadsheets", In Proceedings of 26th ACM Joint Meeting on European Software Engineering Conference and Symposium on the Foundations of Software Engineering, Nov. 4, 2018, pp. 833-838.
Zhang, et al., "Interactive Program Synthesis by Augmented Examples", In Proceedings of the 33rd Annual ACM Symposium on User Interface Software and Technology, Oct. 20, 2020, pp. 627-641.

(56) References Cited

OTHER PUBLICATIONS

Zhang, et al., "Interpretable Program Synthesis", In Proceedings of the CHI Conference on Human Factors in Computing Systems, May 8, 2021, 16 Pages.
"CodeXData: Do Code Generating Language Models Understand Data?", In Proceedings of ACL Rolling Review, Sep. 4, 2022, 35 Pages.
International Preliminary Report on Patentability received for PCT Application No. PCT/US2023/083709, mailed on Jul. 24, 2025, 09 pages.

* cited by examiner

Prompt

Create a column "Abbreviation" concatenating the first character of each part of the name.

[Query]

> Inspect Columns

∨ Inspect Rows

| Index | First Name | Middle Name | Last Name | Abbreviation |
|---|---|---|---|---|
| 4716 | Charlie | | Evans | |

0 more rows...

| 8984 | Victor | Logan | Paradise | VLP |

8 more rows...

GENERATION OF MULTI-DIMENSIONAL ARRAY OF INTERMEDIATE VALUES IN MULTIPLE CODE EXECUTIONS

BACKGROUND

Code is a set of instructions that direct operation of a computing system. It is often important to be able to confirm what code is doing. This may be important when authoring code to be certain that the code is directing the computing system as intended by an author. Debugging tools allow coders to be able to verify operation of code, to thereby correct behavior of the code through editing of that code. However, it is also helpful in some contexts to simply understand what the code does, regardless of whether that code is intended to be edited. Such might be helpful when choosing whether or not to use the code with understanding of what contexts in which the code would be most helpful. Thus, proper understanding of what code is doing is important to correct the code and/or understand how the code can be applied.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, a computer-implemented mechanism is provided to assist in showing how code is operating with different sets of input. This is done by providing organized visibility on intermediate values. When code operates upon an input value set, the code generates an output value set. However, along the way, usually unseen, the code also generates one or more intermediate values. After accessing the code that is to be evaluated along with the multiple input sets for that code, the computing system generates a multi-dimensional array of values. This is done by, for each of at least some of the multiple input sets, generating a corresponding intermediate value set of one or more intermediate values that are generated as the code operates upon the corresponding input set.

Then, the computing system causes a multi-dimensional array of values to be visualized using a multi-dimensional representation. In this multi-dimensional visualization, input sets are represented in at least one dimension against at least one intermediate value of the corresponding intermediate value set in at least another dimension. Thus, a user can scan through how the intermediate values differ by each set of input values. In one embodiment, the computing system even groups the input sets by common characteristics of the intermediate values or corresponding output values, allowing the user to focus in on different scenarios of execution. In further embodiments, the intermediate values and/or groupings may be labelled with natural language.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 4C illustrates a user interface that represents a third user interface in the user experience demonstrated in FIGS. 4A through 4C, and in which a user views groupings of different executions of the code;

DETAILED DESCRIPTION

In accordance with the principles described herein, a computer-implemented mechanism is provided to assist in showing how code is operating with different sets of input. This is done by providing organized visibility on intermediate values. When code operates upon an input value set, the code generates an output value set. However, along the way, usually unseen, the code also generates one or more intermediate values. After accessing the code that is to be evaluated along with the multiple input sets for that code, the computing system generates a multi-dimensional array of values. This is done by, for each of at least some of the multiple input sets, executing the code using that input set. As the code as executed on the input set, the execution not only generates an output value set, but also a corresponding intermediate value set along the way.

Then, the computing system causes a multi-dimensional array of values to be visualized using a multi-dimensional representation. In this multi-dimensional visualization, input sets are represented in at least one dimension against at least one intermediate value of the corresponding intermediate value set in at least another dimension. Thus, a user can scan through how the intermediate values differ by each set of input values (i.e., by each execution against each input set). In one embodiment, the computing system even groups the input sets by common characteristics of the intermediate values or corresponding output values, allowing the user to focus in on different scenarios of execution. In further embodiments, the intermediate values and/or groupings may be labelled with natural language.

Figure 1:
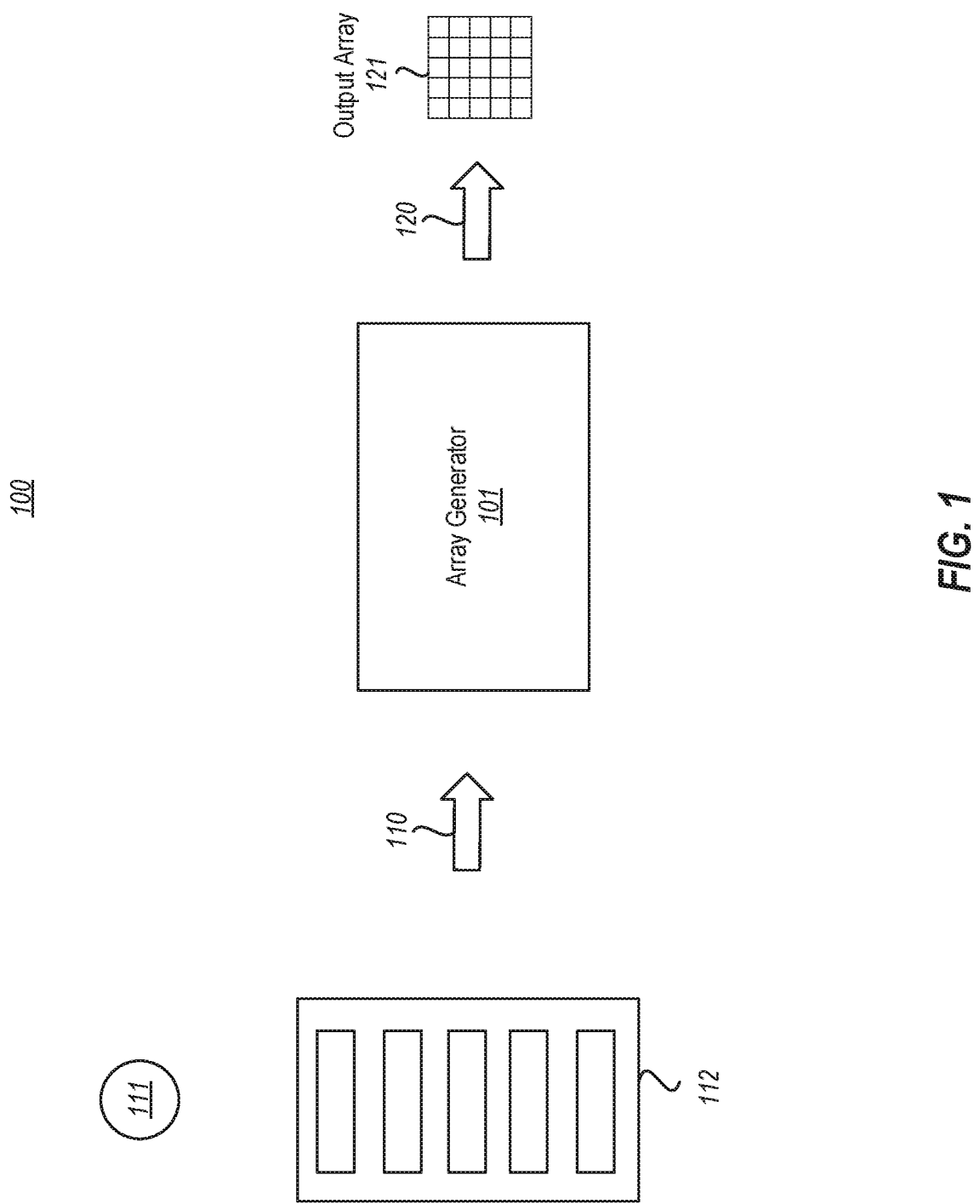
FIG. 1 illustrates an environment in which the principles described herein may operate, which includes an array generation component that receives code and also multiple input sets, and in response generates a multi-dimensional value array.

FIG. 1 illustrates an environment 100 in which the principles described herein may operate. The environment includes an array generation component 101 that receives (as represented by arrow 110) code 111, and also multiple input sets 112. In response, the array generation component 101 generates (as represented by arrow 120) a multi-dimensional value array 121. Each input set represents one or more input values that can be provided to the code when the code is executed. If the array generation component 101 is implemented by a computing system, such as the computing system 600 described below with respect to FIG. 6, the array generation component 101 may be for example as described below for the executable component 606 of FIG. 6.

The code 111 may be any code that is capable of receiving input and generating output. The code may be declarative code (such as a spreadsheet, database or any other declarative code), imperative code, or any other type of code. The principles described herein are not limited to the code type or language of the code 111, nor even whether the code 111 is source code, intermediate language code, or machine code.

Figure 2:
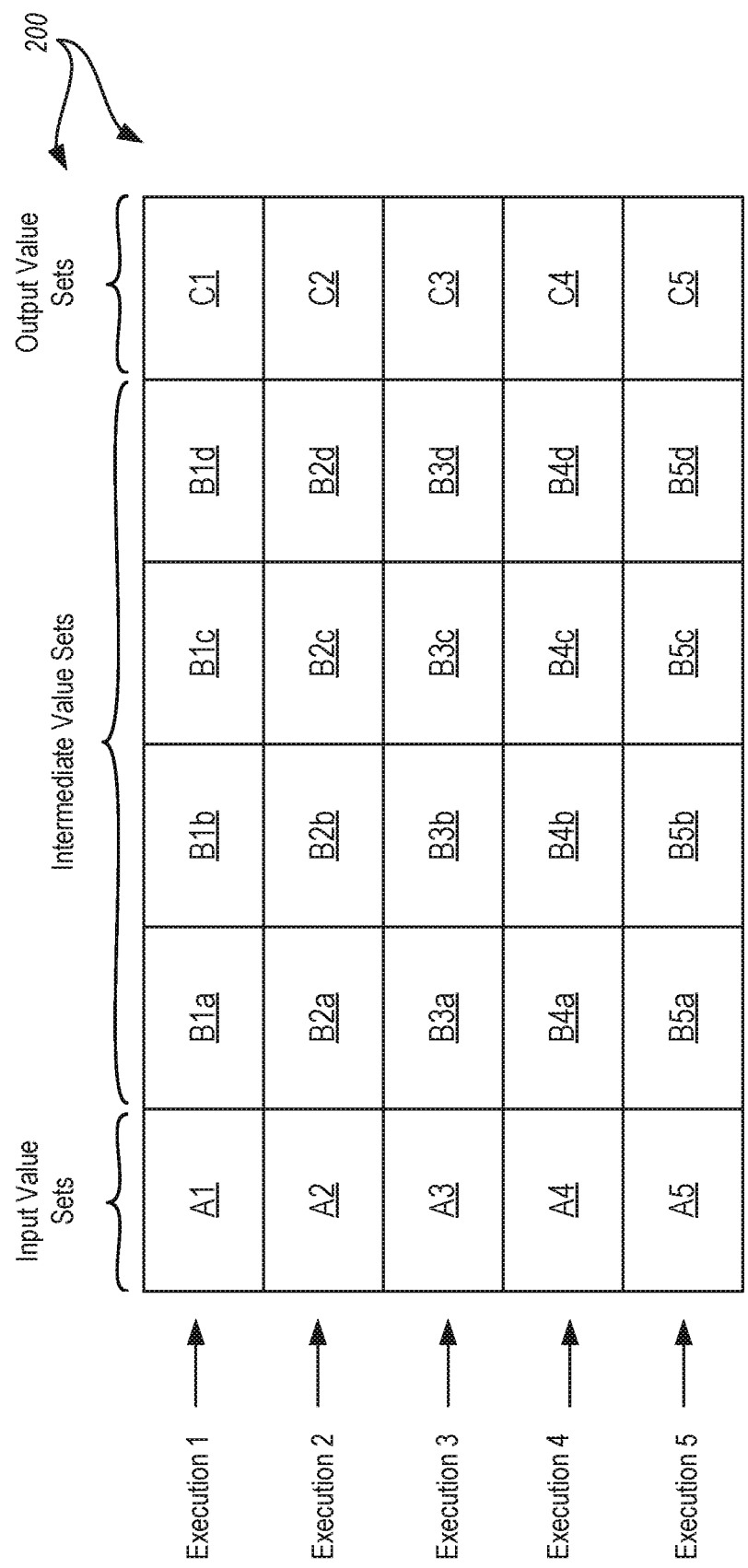
FIG. 2 illustrates an example value array in which values for executions of the code are arrayed against input values, intermediate values and output values of the respective executions.

FIG. 2 illustrates a value array 200 that is illustrated as a mere example. The value array includes, for each of multiple executions of code, the respective input set, a respective intermediate set, and a respecting output set. In this particular example, there are five rows 1 through 5 representing 5 different executions of the code, each using different input sets.

In this value array, input sets are represented by the letter A with a numerical suffix (e.g., 1, 2, 3 and so forth) to distinguish one input set from another. In this example, there are five different input sets A1, A2, A3, A4 and A5, each used in respective executions 1 through 5 of the same code. The numerical suffix may also be seen as representing a respective execution of the code that uses the respective input set of that same representation. For instance, execution 1 of the code uses input set A1, execution 2 of the code uses input set A2, execution 3 of the code uses input set A3, execution 4 of the code uses input set A4, and execution 5 of the code uses input set A5. Of course, this is just an example, the code under evaluation may have any number of executions using any number of input value sets. But this description will refer to the value array 200 of FIG. 2 frequently for purposes of discussion and not limitation.

The value array 200 also includes output sets that are represented by the letter C with a numerical suffix. Each output set represents one or more output values that are output by the code by the corresponding execution. For instance, execution 1 of the code uses input set A1 to generate output set C1, execution 2 of the code uses input set A2 to generate output set C2, execution 3 of the code uses input set A3 to generate output set C3, execution 4 of the code uses input set A4 to generate output set C4, and execution 5 of the code uses input set A5 to generate output set C5.

The value array 200 also includes intermediate value sets that are represented by a numerical suffix and a lowercase letter. The numerical suffix identifies which execution of the code generated the intermediate value. The lowercase letter suffix distinguishes one intermediate value from another in that execution of the code. Each intermediate value set represents in this case four intermediate values that are generated by the respective execution of the code. For instance, execution 1 of the code uses input set A1 to generate output set C1 and along the way generates intermediate values B1$a$, B1$b$, B1$c$ and B1$d$. Execution 2 of the code uses input set A2 to generate output set C2 and along the way generates intermediate values B2$a$, B2$b$, B2$c$ and B2$d$. Execution 3 of the code uses input set A3 to generate output set C3 and along the way generates intermediate values B3$a$, B3$b$, B3$c$ and B3$d$. Execution 4 of the code uses input set A4 to generate output set C4 and along the way generates intermediate values B4$a$, B4$b$, B4$c$ and B4$d$. Execution 5 of the code uses input set A5 to generate output set C5 and along the way generates intermediate values B5$a$, B5$b$, B5$c$ and B5$d$.

However, the multi-dimensional value array 121 generated in FIG. 1 need not (but could) include all of the input sets that could be applied to the code. Alternatively, or in addition, the multi-dimensional value array 121 generated in FIG. 1 need not (but could) include all of the intermediate values that were generated by the code. Alternatively, or in addition, the multi-dimensional value array 121 generated in FIG. 1 need not (but could) include input sets that could be applied to the code, and need not (but could) include the output sets that were generated by the code. In other words, the multi-dimensional value array 121 might not include all of the rows and/or all of the columns of a value array that includes all of the input sets arranged against all of the intermediate values and output sets.

Figure 3:
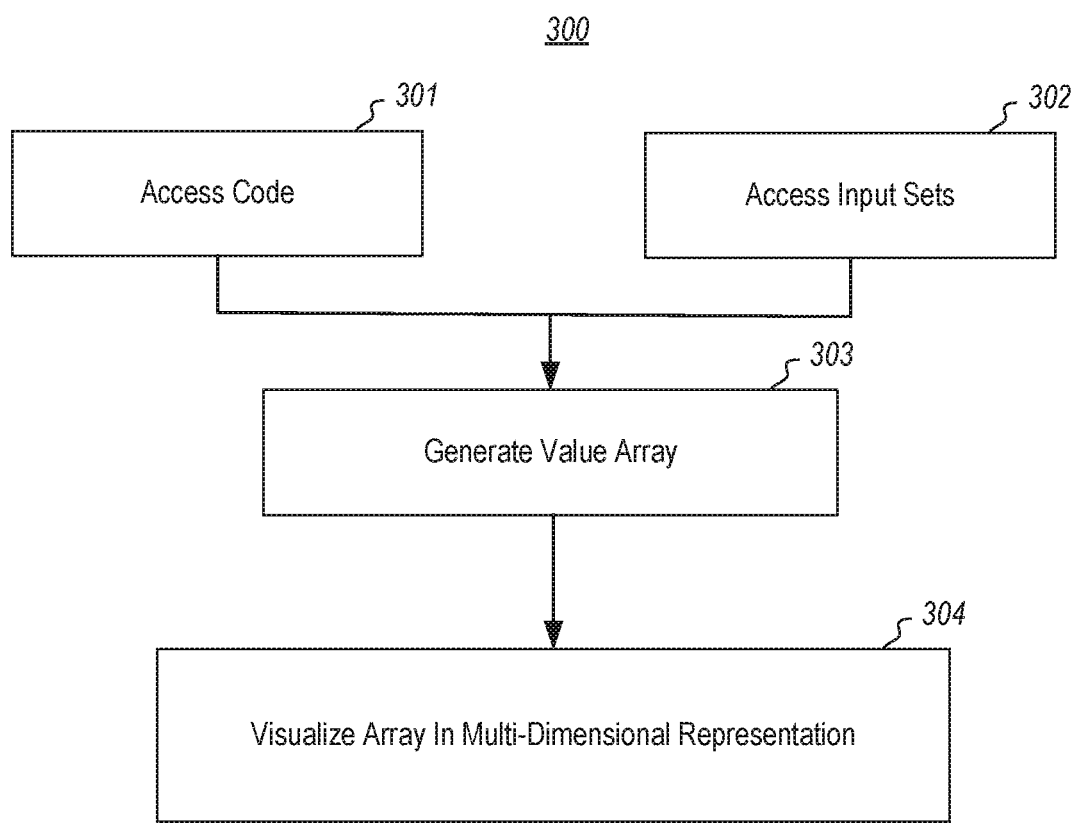
FIG. 3 illustrates a flowchart of a method for causing to be displayed intermediate results of operation of code upon input sets, in accordance with the principles described herein.

FIG. 3 illustrates a flowchart of a method 300 for causing to be displayed intermediate results of operation of code upon input sets, in accordance with the principles described herein. The method 300 may be performed by, for example, the array generation component 101 of FIG. 1. Accordingly, the method 300 will now be described as an example with respect to the environment 100 of FIG. 1.

The method 300 includes accessing code (act 301) and a plurality of input sets of input for the code (act 302). For instance, in FIG. 1, the array generation component 101 accesses (as represented by arrow 110) the code 111 as well as the multiple input sets 112. The acts 301 and 302 are shown in parallel to represent that the principles described herein are not restricted to which of the acts are performed first, or whether or not the acts are performed sequentially, or partially or even fully in parallel. The form of the input sets may differ depending on the code. As an example, if the code 111 is a spreadsheet, the input sets may represent one or more columns of a spreadsheet table.

Then, a multi-dimensional array of values is generated (act 303) by for each of at least some of the input sets, generating a corresponding intermediate value set of one or more intermediate values that are generated as the code operates upon the corresponding input set to generate a corresponding output value set. For instance, with respect to FIG. 2, the array generation component may generate all or a subset of the value array 200.

Thereafter, the array generation component causes the multi-dimensional array of values to be visualized using a multi-dimensional representation (act 304). In this multi-dimensional representation, a visualization of at least some of the plurality of input sets are represented in at least one dimension against at least one intermediate value of the corresponding intermediate value set in at least another dimension. As an example, regardless of the code, the multi-dimensional representation may be a two-dimensional representation, a three-dimensional representation, or even a higher-dimensional representation. However, a two-dimensional representation, such as a table, is an intuitive way to review value arrays regardless of the code type. Furthermore, tables are particularly advantageous when the code is a spreadsheet program as such code is already suitable for presenting tables.

In the case of a table, the input sets may be represented with each input set assigned a row (e.g., each execution of the code assigned a row), and with associated intermediate values assigned a column. Alternatively, input sets may be represented with each input set assigned a column (e.g., each execution of the code assigned a column), and with associated intermediate values assigned a row.

To explain this general principle, a specific example will now be provided. In this example, the code is declarative code within a spreadsheet program. Furthermore, in this example, the input set includes 10 input sets, each assigned a row in a table. In this example, each input set includes information about a (fictional) person including 1) first name, 2) middle name, 3) last name, and 4) date of birth. In addition, there is an index number that uniquely identifies the input set. Table 1 below shows a table that represents multiple input sets in which each input set is represented as a row in the table. In the subject example, the table is a spreadsheet table. For purposes of this application, each name and date of birth is fictional and generated using a random name generator. Any similarity or correlation with any real person is strictly coincidental.

TABLE 1

| Index | First Name | Middle Name | Last Name | DoB |
|---|---|---|---|---|
| 8268 | Victor | Logan | Paradise | Jan. 20, 1968 |
| 0630 | Renata | Vivian | Bernard | Feb. 21, 1971 |
| 5659 | Vulcan | Trip | Styles | Mar. 22, 1972 |
| 6710 | Everly | Mabel | Jauregui | Apr. 23, 1958 |
| 4278 | Princeton | Huntley | Jacobson | May 24, 2001 |
| 2467 | Iliana | Kodiak | Parikh | Jun. 25, 1986 |

TABLE 1-continued

| Index | First Name | Middle Name | Last Name | DoB |
|---|---|---|---|---|
| 1902 | Charlie | | Evans | Jul. 26, 1955 |
| 5562 | Opal | Ramsey | Casto | Aug. 27, 1996 |
| 3626 | Louis | Fox | Martell | Sep. 28, 2003 |
| 0044 | Rosamund | Molly | Gunner | Oct. 29, 1977 |

Table 1 represents an example of the multiple input sets 112 of FIG. 1. Now suppose the code 111 is a spreadsheet program that aims to create a new column called "Abbreviation" that includes the concatenation of the first letter of each part of the person's name. The principles described herein may be used to determine how the code is behaving. For instance, suppose the code is run on the Table 1 resulting in Table 2 illustrated below.

TABLE 2

| Index | First Name | Middle Name | Last Name | DoB | Abbreviation |
|---|---|---|---|---|---|
| 8268 | Victor | Logan | Paradise | Jan. 20, 1968 | VLP |
| 0630 | Renata | Vivian | Bernard | Feb. 21, 1971 | RVB |
| 5659 | Vulcan | Trip | Styles | Mar. 22, 1972 | VTS |
| 6710 | Everly | Mabel | Jauregui | Apr. 23, 1958 | EMJ |
| 4278 | Princeton | Huntley | Jacobson | May 24, 2001 | PHJ |
| 2467 | Iliana | Kodiak | Parikh | Jun. 25, 1986 | IKP |
| 1902 | Charlie | | Evans | Jul. 26, 1955 | |
| 5562 | Opal | Ramsey | Casto | Aug. 27, 1996 | ORC |
| 3626 | Louis | Fox | Martell | Sep. 28, 2003 | LFM |
| 0044 | Rosamund | Molly | Gunner | Oct. 29, 1977 | RMG |

The rightmost column of the Table 2 represents the output set, which for each input set, is the abbreviation. However, somehow, the code has two separate behaviors. The first behavior is that indeed the abbreviated value includes the concatenation of first name, middle name, and last name. This first behavior occurred for all input sets, except one. That is, for the input set corresponding to Charlie Evans, the output set was empty, which represents a second behavior. This second behavior seems to relate to the middle name of the input set being empty.

To verify this hypothesis, the user might select to see some intermediate values in the context of the Table 2. Table 3 below illustrates two intermediate value columns being added to the table, one for last name, and one for the concatenation of the first and middle names.

TABLE 3

| Index | First Name | Middle Name | Last Name | DoB | Text Concatenation | 1st Letter of Last Name | Abbreviation |
|---|---|---|---|---|---|---|---|
| 8268 | Victor | Logan | Paradise | Jan. 20, 1968 | VL | P | VLP |
| 0630 | Renata | Vivian | Bernard | Feb. 21, 1971 | RV | B | RVB |
| 5659 | Vulcan | Trip | Styles | Mar. 22, 1972 | VT | S | VTS |
| 6710 | Everly | Mabel | Jauregui | Apr. 23, 1958 | EM | J | EMJ |
| 4278 | Princeton | Huntley | Jacobson | May 24, 2001 | PH | J | PHJ |
| 2467 | Iliana | Kodiak | Parikh | Jun. 25, 1986 | IK | P | IKP |
| 1902 | Charlie | | Evans | Jul. 26, 1955 | Empty | E | |
| 5562 | Opal | Ramsey | Casto | Aug. 27, 1996 | OR | C | ORC |
| 3626 | Louis | Fox | Martell | Sep. 28, 2003 | LF | M | LFM |
| 0044 | Rosamund | Molly | Gunner | Oct. 29, 1977 | RM | G | RMG |

The columns labelled Text Concatenation and 1st Letter of Last Name are automatically generated and show intermediate values generated in the execution of the code against the corresponding input data to generate the corresponding Abbreviation output set. From this visualization, the second intermediate value is the first letter of the last name. The code correctly generates this first letter of the last name for all input sets. However, the code did not properly generate the concatenation of the first name and the middle name for the input set for Charlie Evans. Instead, the code generates an empty result for that concatenation. The user may further inspect the intermediate values that led to that incorrect intermediate value resulting in Table 4.

FIG. 1. Here, the user can see that indeed the code did create a new column, and a correct set of abbreviations for most names. However, there is one name that the code failed entirely to generate an abbreviation for. Thus, the user can see from comparing the input sets with the output sets that an unexpected and/or unwanted behavior resulted.

The user may then navigate the executions of the code to find out what happened. To do this, the user may then go into the "Inspect Columns" portion 410 (e.g., by selecting the drop down 411 to view the code navigation field 412 and thus see how the natural language prompt was translated into code. Here, the code navigation field includes the abbreviation icon 431. The icon is titled with the same name as the

TABLE 4

| Index | First Name | Middle Name | Last Name | DoB | 1st Letter of First Name | 1st Letter of Middle Name | Text Concatenation | 1st Letter of Last Name | Abbreviation |
|---|---|---|---|---|---|---|---|---|---|
| 8268 | Victor | Logan | Paradise | Jan. 20, 1968 | V | L | VL | P | VLP |
| 0630 | Renata | Vivian | Bernard | Feb. 21, 1971 | R | V | RV | B | RVB |
| 5659 | Vulcan | Trip | Styles | Mar. 22, 1972 | V | T | VT | S | VTS |
| 6710 | Everly | Mabel | Jauregui | Apr. 23, 1958 | E | M | EM | J | EMJ |
| 4278 | Princeton | Huntley | Jacobson | May 24, 2001 | P | H | PH | J | PHJ |
| 2467 | Iliana | Kodiak | Parikh | Jun. 25, 1986 | I | L | IK | P | IKP |
| 1902 | Charlie | | Evans | Jul. 26, 1955 | C | Empty | Empty | E | |
| 5562 | Opal | Ramsey | Casto | Aug. 27, 1996 | O | R | OR | C | ORC |
| 3626 | Louis | Fox | Martell | Sep. 28, 2003 | L | F | LF | M | LFM |
| 0044 | Rosamund | Molly | Gunner | Oct. 29, 1977 | R | M | RM | G | RMG |

Now there are four intermediate value columns shown. The user can see that for Charlie Evans, the empty value for the concatenation is the result of the 1st letter of the middle name intermediate value being empty. Thus, the user can see that code correctly determined the first letter of the first name for all input sets. However, the user can also see that the 1 st letter of the middle name shows empty for the input set of Charlie Evans, and that this error propagated from there resulting in no output for the abbreviation for the input set of Charlie Evans. The user can then try to fix the code, or at least has a better understanding of what the code is able to do. That is, the code can correctly generate initials for names of people that have a first name, a middle name, and a last name, but cannot be relied upon if the input set is missing a middle name.

Figure 4A:
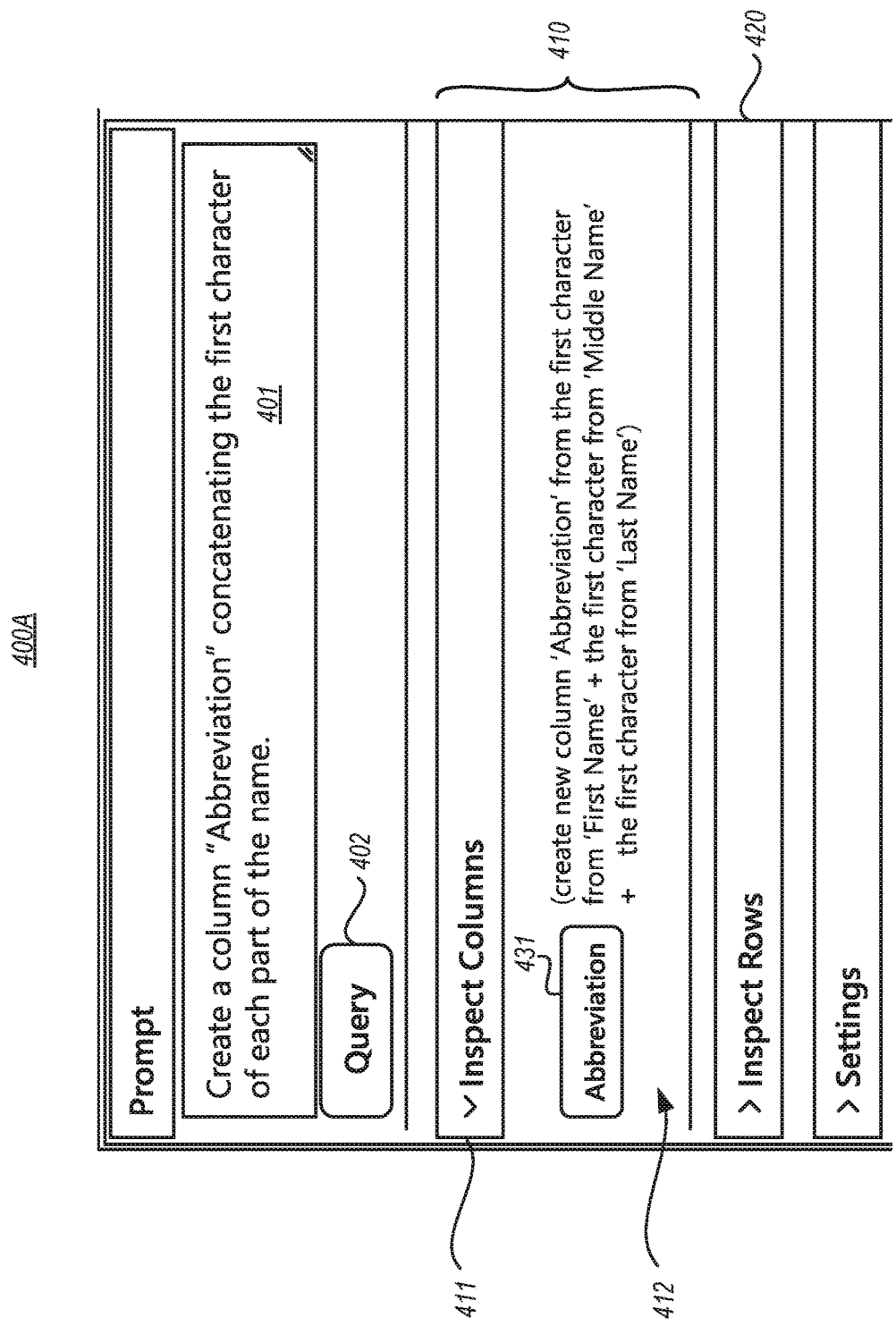
FIG. 4A illustrates a user interface that represents a first user interface in the user experience demonstrated in FIGS. 4A through 4C, and in which a user enters a natural language prompt and resulting automatically generated code is shown.
Figure 4B:
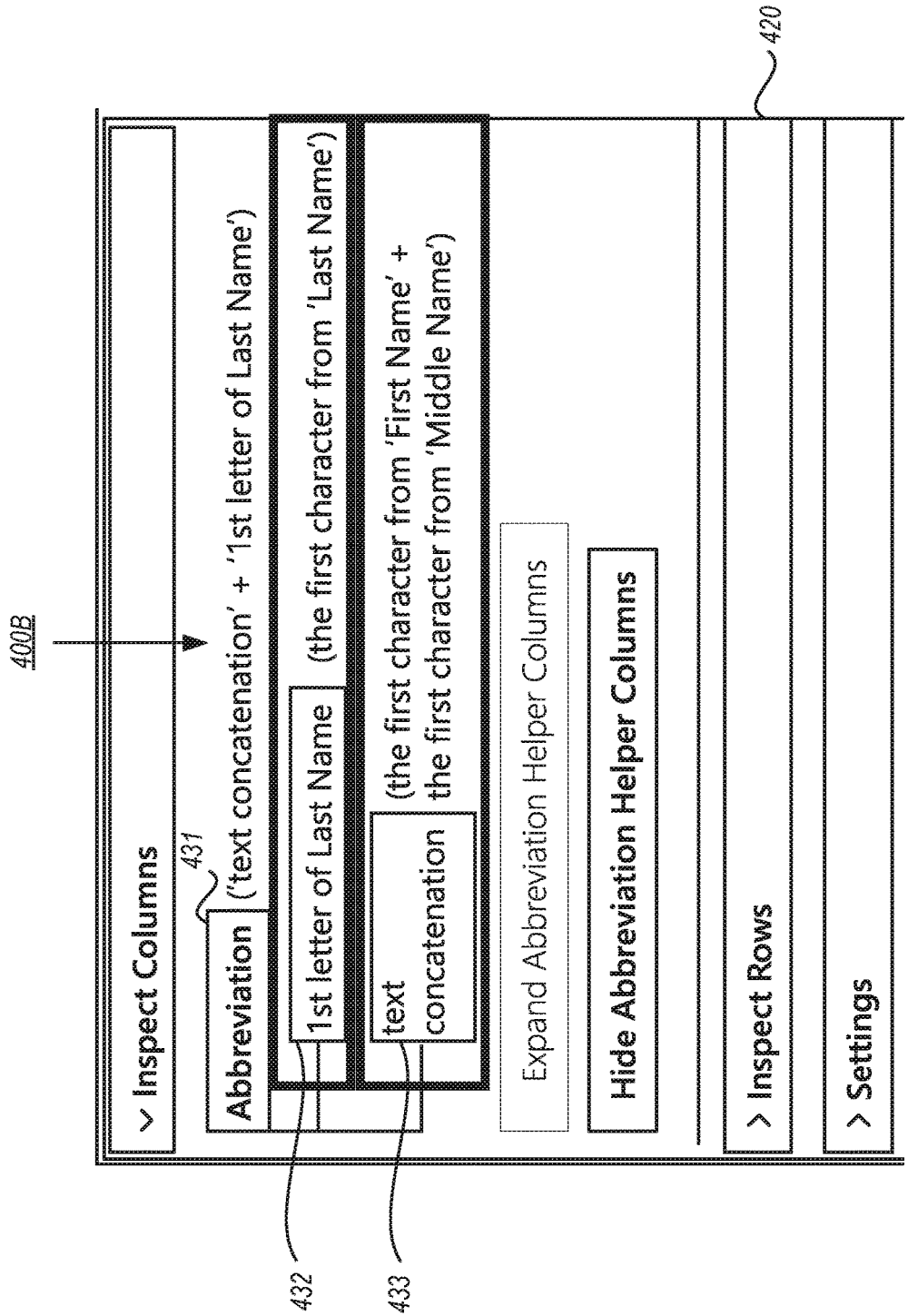
FIG. 4B illustrates a user interface that represents a second user interface in the user experience demonstrated in FIGS. 4A through 4C, and in which a user navigates to decompose the code.

FIGS. 4A through 4C illustrate three user interfaces 400A, 400B and 400C that represent an example user experience showing how Tables 1 through 4 may be generated and visualized. In this user experience, suppose that the user already has access to Table 1 in the form of a spreadsheet. Thus, the spreadsheet of Table 1 represents the input sets.

In FIG. 4A, the user enters a natural language prompt in field 401. This natural language prompt is a description in natural language of what the user wants to do with the spreadsheet of Table 1. Then, the user submits the natural language prompt as a query by selecting the "Query" control 402. In one example, this submission of the query may result in the natural language prompt being input to a language model that is trained to generate code in response to the natural language. For instance, the natural language prompt may include a natural language description of what the user wants the resulting code to be able to do with the input sets. In this case, the user wants to create a column called "Abbreviation" that concatenates the first character of each part of the name in each input set. This results in code being generated by the language model.

Table 2 may represent a new spreadsheet that is generated by executing that generated code against the input sets of new column, letting the user know that the corresponding code relates to the actual output of the execution.

A natural language description of the code that was generated by the language model is illustrated in the field 412. Thus, by reviewing the field 412 in FIG. 4A, the user can see that the code creates a new "Abbreviation" column by reviewing the following natural language description: (create new column 'Abbreviation' from the first character from 'First Name'+the first character from 'Middle Name'+ the first character from 'Last Name'. By just looking at the natural language description at this level, a user may be able to determine why the code has this unexpected behavior. However, the principles described herein allow the user to cause the code to be decomposed, wherein the user can view the decompositions or natural language descriptions of the decomposition.

The user can then decompose the code by selecting the abbreviation icon 431. This abbreviation icon 431 represents the output column called "Abbreviation". This results in two helper columns (e.g., called "1st letter of Last Name" and "text concatenation") being displayed in Table 3, and representative icons 432 and 433 of these the two helper columns is also shown in the inspect columns field. Also, a natural language description of the code for the decomposition are displayed as natural language description labelling the helper columns. For instance, the helper column called "1st letter of Last Name" is generated by executing the code "the first character from 'Last Name'. In addition, the text concatenation column was generated using the code that is described in natural language as "the first character from 'First Name'+the first character from 'Middle Name". The icon 433 may be selected to further decompose who the text concatenation column value was generated resulting in Table 4.

In one embodiment, the input sets are grouped according to a common property or value of one or more corresponding intermediate values of the corresponding intermediate value set. For example, in FIG. 4C, the inspect rows field 420 shows two groups 421 and 422. The groupings include a group 421 of input sets in which a middle name was not present (which includes in this example but a single input set), and a group 422 of inputs sets in which a middle name was present (which includes in this example nine input sets). The groupings may have a natural language label. For instance, group 431 might have a label "those without a middle name" and group 432 might have a label "those with a middle name".

Figure 5:
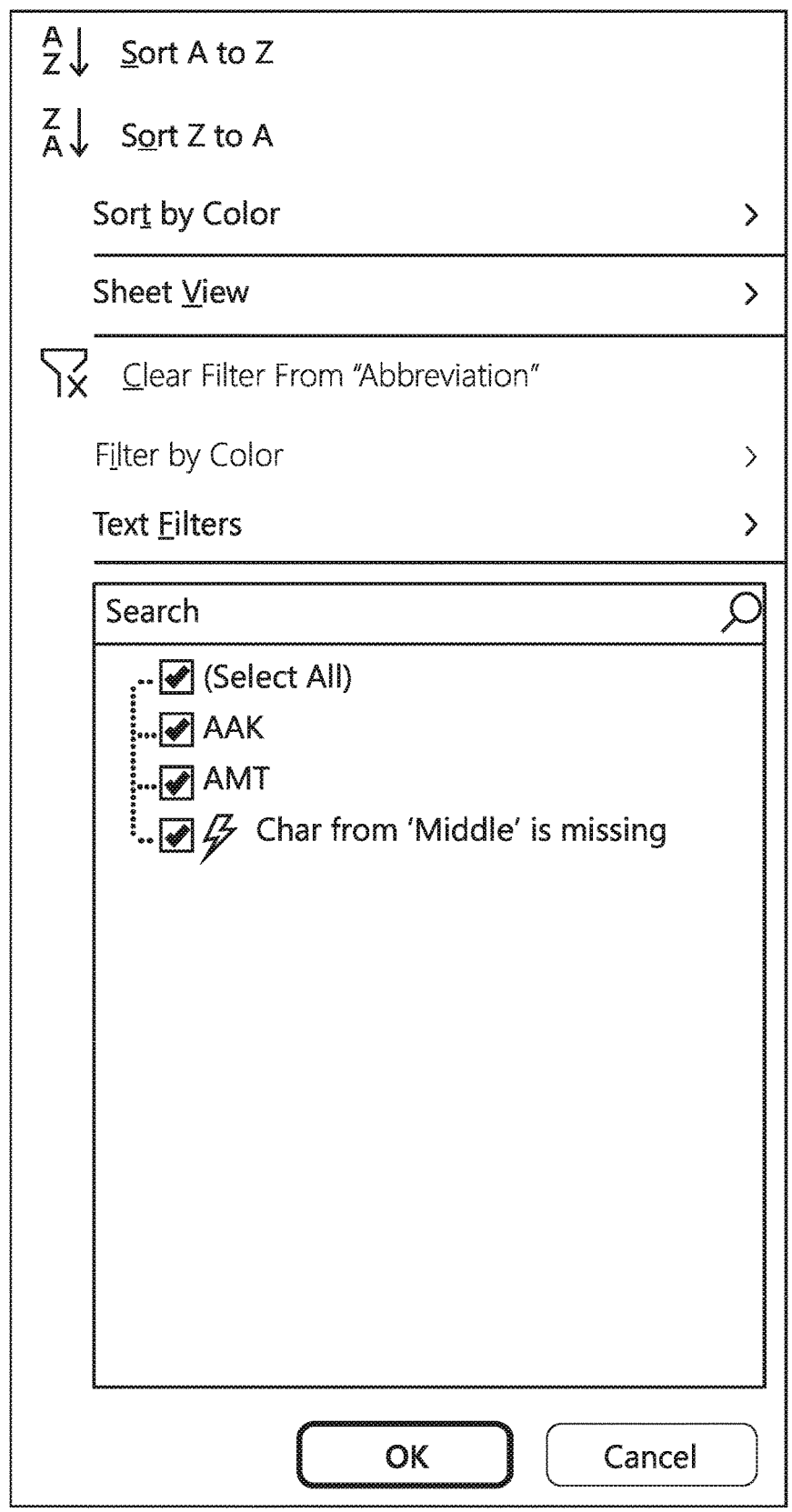
FIG. 5 illustrates a user interface in which the groupings are used to add a sort option.

Here, the groupings are grouped in the same dimension as the input sets are aligned. Thus, it appears to the user then that the input sets are grouped according to one or more properties and/or values of the input set, intermediate set and/or output set. This allows the user to more quickly see the different behaviors that the code executed depending on the input set. The user may even configure what the common property or values are that are to be used to perform the groupings. The label of the grouping may be used to automatically add a sort filter option in the spreadsheet, as in the example of FIG. 5.

FIGS. 4A through 4C just show one of an innumerable variety of user experiences that may occur using the principles described herein. In another embodiment, the computing system breaks down the task into a sequence of tasks expressed in natural language. In yet another embodiment, rather than decompose the code one step at a time as in FIGS. 4A through 4C and Tables 1 through 4, the user may simply command the decomposition to fully occur, jumping straight from Table 1 to Table 4.

As the principles described herein may be performed in the context of a computing system, a computing system will now be described with respect to FIG. 6. However, the principles described herein are not limited to operation within a computing system such as described with respect to FIG. 6.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
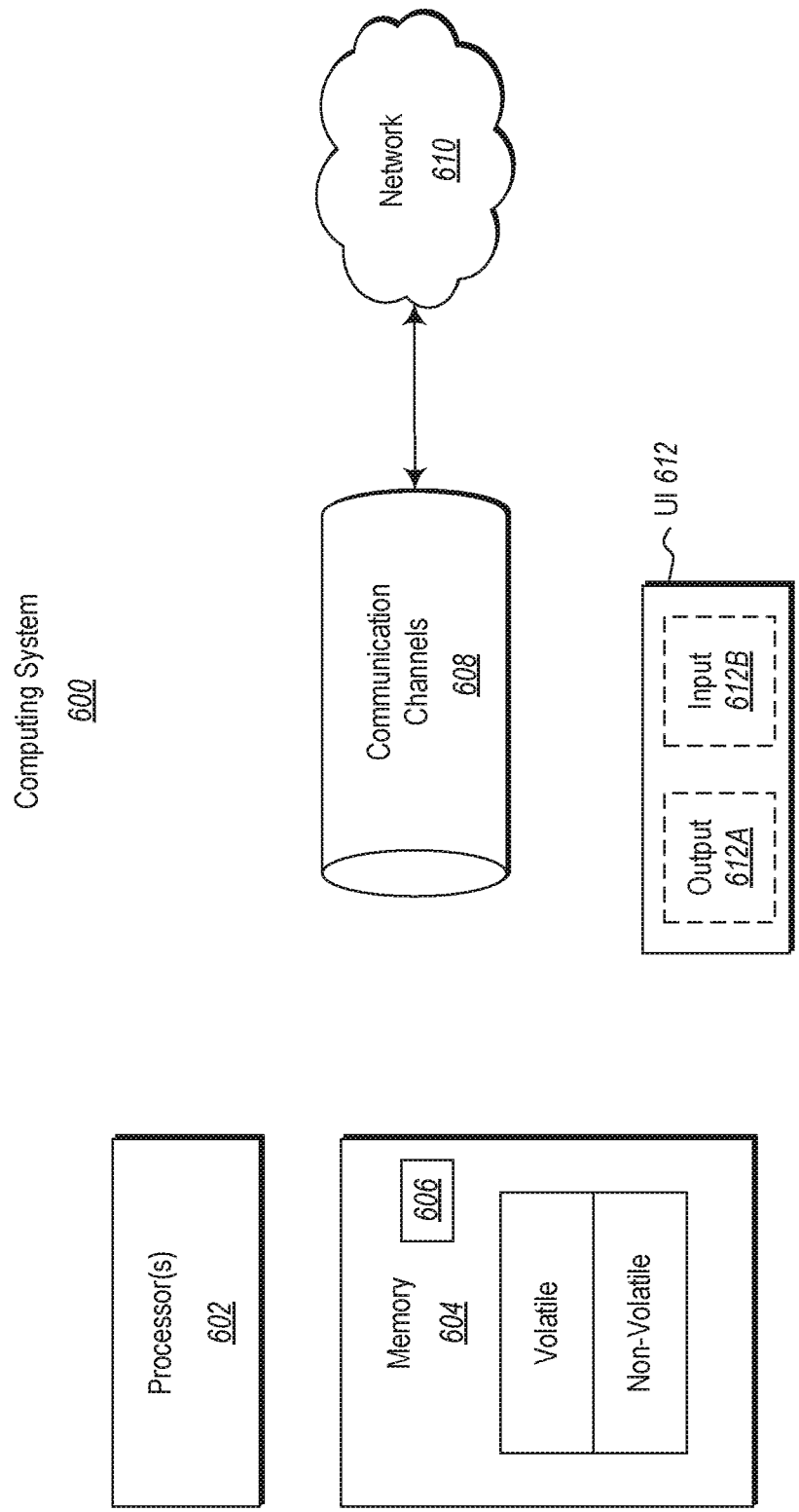
FIG. 6 illustrates an example computing system in which the principles described herein may be employed.

As illustrated in FIG. 6, in its most basic configuration, a computing system 600 includes at least one hardware processing unit 602 and memory 604. The processing unit 602 includes a general-purpose processor. Although not required, the processing unit 602 may also include a field programmable gate array (FPGA), an application specific integrated circuit (ASIC), or any other specialized circuit. In one embodiment, the memory 604 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 600 also has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, virtual or augmented reality, holograms and so forth. Examples of input mechanisms 612B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed:

1. A computing system that displays intermediate results of an operation of code, said computing system comprising:

one or more processors; and
one or more hardware storage devices that store instructions that are executable by the one or more processors to cause the computing system to:
  access (i) code, (ii) a first input set for the code, and (iii) a second input set for the code;
  generate a multi-dimensional array of values by:
    generating, for the first input set, a first intermediate value set of intermediate values that are generated as the code operates on the first input set; and
    generating, for the second input set, a second intermediate value set of intermediate values that are generated as the code operates on the second input set; and
  cause the multi-dimensional array of values to be visualized using a multi-dimensional representation in which a visualization of the first and second input sets are represented in a first dimension against one or more intermediate values represented in a second dimension,
  wherein:
    the intermediate value is selected from at least one of the first or second intermediate value sets,
    the first and second input sets are at least partially grouped according to a selected common property or value, resulting in formation of a group, and
    said resulting group occurs along the first dimension.

2. The computing system in accordance with claim 1, wherein said group is visualized in association with a computer-generated natural language description of the group.

3. The computing system in accordance with claim 1, wherein the common property or value is configurable by a user such that the user can select how the first and second input sets are grouped.

4. The computing system in accordance with claim 1, wherein the second dimension has computer-generated natural language labels corresponding to the one or more intermediate values.

5. The computing system in accordance with claim 1, the code comprising declarative code.

6. The computing system in accordance with claim 5, the code comprising a spreadsheet.

7. The computing system in accordance with claim 5, the code comprising a database.

8. The computing system in accordance with claim 1, the code comprising imperative code.

9. The computing system in accordance with claim 1, wherein the multi-dimensional representation is a table.

10. The computing system in accordance with claim 1, wherein the first and second input sets have corresponding rows.

11. The computing system in accordance with claim 1, wherein the multi-dimensional representation is a two-dimensional representation.

12. A method for displaying intermediate results of an operation of code, said method comprising:
  accessing (i) code, (ii) a first input set for the code, and (iii) a second input set for the code;
  generating a multi-dimensional array of values by:
    generating, for the first input set, a first intermediate value set of intermediate values that are generated as the code operates on the first input set; and
    generating, for the second input set, a second intermediate value set of intermediate values that are generated as the code operates on the second input set; and
  causing the multi-dimensional array of values to be visualized using a multi-dimensional representation in which a visualization of the first and second input sets are represented in a first dimension against one or more intermediate values represented in a second dimension,
  wherein:
    the intermediate value is selected from at least one of the first or second intermediate value sets,
    the first and second input sets are at least partially grouped according to a selected common property or value, resulting in formation of a group, and
    said resulting group occurs along the first dimension.

13. The method of claim 12, wherein said group is visualized in association with a natural language description.

14. The method of claim 12, wherein the common property or value is the common property.

15. The method of claim 12, wherein the common property or value is the value.

16. The method of claim 12, wherein the common property or value is selected by a user.

17. The method of claim 12, wherein the second dimension includes labels.

18. The method of claim 12, wherein the code includes declarative code.

19. The method of claim 12, wherein the code includes a spreadsheet.

20. One or more hardware storage devices that store instructions that are executable by one or more processors to cause the one or more processors to:
  access (i) code, (ii) a first input set for the code, and (iii) a second input set for the code;
  generate a multi-dimensional array of values by:
    generating, for the first input set, a first intermediate value set of intermediate values that are generated as the code operates on the first input set; and
    generating, for the second input set, a second intermediate value set of intermediate values that are generated as the code operates on the second input set; and
  cause the multi-dimensional array of values to be visualized using a multi-dimensional representation in which a visualization of the first and second input sets are represented in a first dimension against one or more intermediate values represented in a second dimension,
  wherein:
    the intermediate value is selected from at least one of the first or second intermediate value sets,
    the first and second input sets are at least partially grouped according to a selected common property or value, resulting in formation of a group, and
    said resulting group occurs along the first dimension.

* * * * *